US008804697B1

(12) United States Patent
Capper et al.

(10) Patent No.: US 8,804,697 B1
(45) Date of Patent: Aug. 12, 2014

(54) DISTRIBUTED CALL ROUTING IN A VOIP SYSTEM

(75) Inventors: Simon Capper, Sunnyvale, CA (US); Kelvin Leonard Cheung, Sunnyvale, CA (US)

(73) Assignee: ooma, Inc., Palo Alto, CA (US)

( * ) Notice: Subject to any disclaimer, the term of this patent is extended or adjusted under 35 U.S.C. 154(b) by 1343 days.

(21) Appl. No.: 12/139,336

(22) Filed: Jun. 13, 2008

(51) Int. Cl.
*H04L 12/66* (2006.01)
*H04L 29/06* (2006.01)

(52) U.S. Cl.
CPC ..................... *H04L 65/00* (2013.01)
USPC ........................................................ 370/352

(58) Field of Classification Search
CPC ...................................................... H04L 65/00
USPC .......................................................... 370/352
See application file for complete search history.

(56) References Cited

U.S. PATENT DOCUMENTS

| 5,991,301 | A | 11/1999 | Christie |
| 6,104,711 | A | 8/2000 | Voit |
| 6,452,932 | B1 | 9/2002 | Christie |
| 6,577,638 | B1 * | 6/2003 | Tashiro et al. ............... 370/401 |
| 7,733,850 | B1 * | 6/2010 | Croak et al. ................. 370/352 |
| 2005/0152339 | A1 * | 7/2005 | Scott et al. .................... 370/352 |
| 2006/0007915 | A1 * | 1/2006 | Frame .......................... 370/352 |
| 2006/0013195 | A1 * | 1/2006 | Son et al. ...................... 370/352 |
| 2008/0037742 | A1 * | 2/2008 | Greenberg ................... 379/143 |
| 2008/0247382 | A1 * | 10/2008 | Verma et al. ................. 370/352 |
| 2010/0098058 | A1 * | 4/2010 | Delangis ....................... 370/352 |
| 2010/0278173 | A1 * | 11/2010 | Dalton et al. ................. 370/352 |

* cited by examiner

*Primary Examiner* — Mark Rinehart
*Assistant Examiner* — Christopher R Crompton
(74) *Attorney, Agent, or Firm* — Kilpatrick Townsend & Stockton LLP

(57) ABSTRACT

A distributed call routing system and method are used to provide higher quality VoIP connections with flexible codec choices and simplified NAT and firewall traversal. An analog telephone adapter (ATA) communicates a call destination to a network information server (NIS), which provides multiple routes. The ATA uses this information and local and/or non-NIS information to initiate the call using the preferred routing.

18 Claims, 2 Drawing Sheets

DISTRIBUTED CALL ROUTING IN A VOIP SYSTEM

BACKGROUND OF THE INVENTION

This invention relates generally to voice over Internet protocol (VoIP) technology, and particularly to how call routing is performed to improve bandwidth efficiency, call quality, call setup time and call handling flexibility.

In a public switched telephone network (PSTN), an initiating phone connects to a circuit switch and the PSTN via a first POTS (Plain Old Telephone System) line. A destination phone connects to the circuit switch and the PSTN via a second POTS line. The circuit switch electrically connects the initiating phone to the destination phone over the PSTN. The electrical connection is maintained for the entire duration of a phone call between the initiating phone and the destination phone. The electrical connection in the PSTN is commonly referred to as "circuit switched."

Voice over Internet protocol (VoIP) is a technology that permits phone calls to be carried over the Internet as opposed to over the PSTN. Being packet switched, carrying voice over the Internet is far more bandwidth efficient than circuit switched voice communications. In VoIP, a device known as an analog telephone adapter (ATA) or media gateway serves as an interface between an analog phone and the packet-based Internet. The ATA may be a standalone device or may be incorporated into another device such as a cordless phone base station or broadband modem. An initiating ATA converts analog signals from an initiating phone into packets using a voice codec (coder/decoder) algorithm. At the destination phone, to receive an incoming VoIP phone call, a destination ATA receives packets into a buffer and uses the same codec algorithm to convert the packets back into analog signals.

Typically, ATAs provide VoIP functionality via a connection to a broadband modem, such as through a cable modem or a digital subscriber line (DSL) connection to the Internet. Typically the VoIP service provider strives to emulate the behavior and reliability of the PSTN while offering a lower cost for delivering the service or increased functionality.

In a typical call scenario a call is initiated by a VoIP subscriber by going off hook from a telephone connected to an ATA. The ATA collects the DTMF tones generated by the analog phone and determines which phone number the subscriber is calling. A message with the target phone number is sent over the broadband network connected to the ATA to a server which determines how the call should be routed to complete the call. When the call is directed to a POTS subscriber, the packets associated with the call are ultimately routed to a termination gateway which converts the packets from packetized digital format to an analog signal for eventual delivery to the destination phone number. If the call is directed to another subscriber to the same VoIP service then the call may be routed directly to that subscriber's ATA, bypassing the termination gateway. If, as described in U.S. patent application Ser. No. 10/888,603 for "Connecting a VoIP phone call using a shared POTS line" (U.S. Pub. No. 2006/0007915), a PSTN line is connected to the ATA, then the call may be completed through that PSTN connection.

Previous VoIP and packet-based telephony systems have been hampered by several difficulties related to call routing which degraded the quality, reliability, flexibility and bandwidth efficiency of calls they carried. In general, these problems have been accepted as an inevitable trade-off for the advantages (e.g., low cost, portability,) VoIP systems provide. Since the underlying technology of VoIP systems is likely to improve, it is assumed that the present problems with VoIP systems will diminish over time.

SUMMARY OF THE INVENTION

Embodiments of the present invention can address one or more of the problems mentioned above without having to wait for the technology to improve. To the extent that the underlying technology improves, the embodiments of the present invention will tend to exploit the improvements. Embodiments of the present invention, in various aspects, recognize underlying and sometimes unintended consequences of the way systems have been designed, and works around them.

For example, previous VoIP systems rely heavily upon centralized intelligence and decision making to control the network and route calls. Centralized servers are typically used to both monitor the network and make decisions for how a call is to be routed. One aspect of the invention relates to a recognition of the way that this heavy reliance upon centralized call routing degrades the reliability and quality of calls. This centralized call routing can lead to slow and unreliable call setup and possible problems stemming from race conditions related to the latency between the time it takes centralized processing elements to detect conditions which may affect call routing and the time it takes to communicate routing decisions out to the elements of the network such as the ATAs and termination gateways which actually carry the call connection.

Such centralized routing systems fail to take advantage of more sophisticated ATAs which may perform functions beyond telephony and for which it is impractical to have all routing decisions centralized. In such multi-function devices, routing decisions may need to take into account local conditions such as the existence and availability of an attached PSTN line, possible alternate paths to the called party or unique capabilities of the ATA which may require going outside of the VoIP network to fully exploit. Embodiments of the present invention provide systems and methods to distribute the routing intelligence to allow the routing to be conditioned upon more timely and accurate information that is best gathered and processed by the ATA rather than a central server.

As another example, the techniques for compressing the digitized voice at the ATA are undergoing rapid technological improvement to provide greater bandwidth efficiency and error concealment. However, unless all network elements support these new codecs, they cannot be fully exploited by VoIP systems. For example, the G.711 standard (ITU-T G.711) codec has commonly been used as a codec in VoIP systems, but the usual usage of that codec in VoIP systems does a poor job of handling lost or late packets (a common occurrence in packet networks) and consumes more bandwidth as compared to linear predictive codecs like iLBC, G.726 or G.729.

However, to complete a call the compressed data format must be compatible with the codecs used on the termination gateways used to translate the call from a digital, packetized format to an analog stream for transmission to the destination over the PSTN. These termination gateways are evolving at a much slower rate than are ATAs which often prevents ATAs from employing the most advanced codecs. The result is that calls are forced to use the "lowest common denominator" codec to maintain compatibility with less advanced termination gateways, sacrificing bandwidth and voice quality. Embodiments of the present invention decouple the codec technology used by the ATAs from that used by the termination gateways so that the best possible bandwidth efficiency and voice quality can be maintained from the subscriber's ATA through the VoIP service operator's network and the PSTN.

Embodiments of the present invention address the need to provide a simple plug-and-play installation of the ATA even in the presence of network routers and security firewalls which may disrupt the flow of packets from the ATA to the network for routing.

Embodiments of the present invention provide a distributed network routing architecture that is able to take advantage of increasingly intelligent multi-function ATAs, flexible to handle the rapid evolution of codec technology and capable of efficiently traversing routers and security firewalls to provide an easy plug-and-play experience for the end user.

According to an aspect of the present invention, a system for controlling the routing of VoIP calls comprises a network information server (NIS) having a database of information helpful to optimally routing calls to their respective destinations, and an analog telephone adapter (ATA) having a network connector to allow the ATA to receive calls from and place calls to a packet network. The ATA is configured to: communicate, via the network connector, a call destination to the NIS; receive, via the network connector, information from the NIS relevant to routing of the call; determine the ultimate route of the call based on a plurality of routes derived from the information from the NIS and at least one other possible route; and initiate the call using the preferred routing.

The ATA may include a connection to a PSTN line which may optionally be used to complete a call. The ATA may include a local (subscriber-site) network connection to allow multiple simultaneous calls to be routed through the ATA. The NIS may be configured to determine what phone numbers are local to the phone number of any particular subscriber. The NIS may include means to authenticate the originating ATA. The NIS may be configured to determine what termination gateways or services may be used to terminate a call. The NIS may be configured to determine the IP address which can properly handle calls to special phone numbers.

According to another aspect of the present invention, a method, performed by an analog telephone adapter (ATA), for controlling the routing of calls in a VoIP system comprises: determining the destination of a call on the basis of input signals; requesting routing information for the destination from a network information server (NIS), the NIS having a database of information helpful to optimally routing calls to their respective destinations; ascertaining one or more non-NIS conditions relevant to routing of the call; receiving multiple candidate IP addresses from the NIS; determining a preferred routing of the call based on the IP addresses received from the NIS and the one or more non-NIS conditions; and initiating the call using the preferred routing.

The one or more non-NIS conditions can include a condition local to the ATA (such as the presence of a PSTN connection or the capability to use a transmission medium other than the VoIP network) and or information received from a network resource other than the NIS (such as an indication that a receiving ATA requires a particular audio format to receive a call or an indication that a receiving ATA is currently unavailable to receive a call over IP).

According to another aspect of the present invention, a system for controlling the routing of VoIP calls comprises an analog telephone adapter (ATA) and network infrastructure addressable by the ATA to place a call. The ATA has a network connector to allow the ATA to receive calls from and place calls to a packet network, and is configured to encode audio signals and decode encoded audio signals using one or more codecs including a particular preferred codec. The network infrastructure includes a mechanism to determine a preferred codec for a termination gateway operable to terminate the call from the ATA, a transcode server to translate audio signals between the codec preferred by the ATA and the codec preferred by a termination gateway integrated with a mechanism for traversing Network Address Translation (NAT) for ATAs located behind NAT devices.

According to another aspect of the present invention, a method, performed by a server, for transcoding calls and traversing NAT devices in a VoIP system comprises: determining a termination gateway for a call originating from an analog telephone adapter (ATA), the termination gateway and the ATA having respective preferred codecs configured to encode audio signals and decode encoded audio signals; transcoding audio signals between the codec preferred by the ATA and a codec compatible with the codec preferred by the termination gateway; and executing a protocol to traverse any NAT devices between the ATA and the server.

In this context, when an entity is stated as being configured to perform a function, this means that the entity includes structure, e.g., circuitry, that when energized or enabled, performs the function and/or software code, that when executed by a processor, results in the performance of the function. This is basically a statement that the function can be performed in hardware, software, firmware, or any combinations thereof.

A further understanding of the nature and advantages of the present invention may be realized by reference to the remaining portions of the specification and the drawings.

DESCRIPTION OF SPECIFIC EMBODIMENTS

Overview of System Architecture

Figure 1:
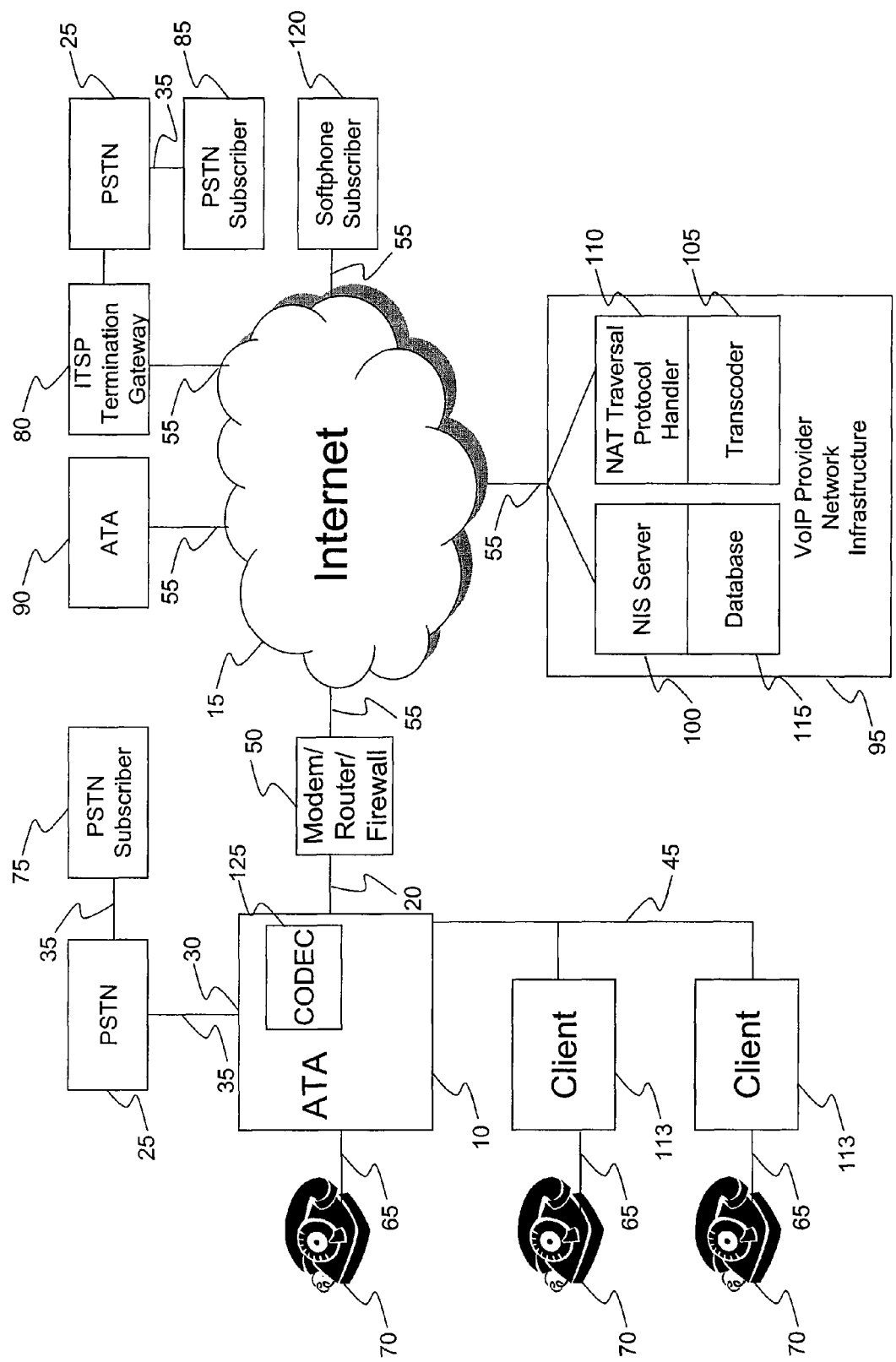
FIG. 1 is a block diagram showing the major system elements and interconnects in an embodiment of the present invention.

FIG. 1 is a block diagram showing the major system elements and interconnects in an embodiment of the present invention. In brief, embodiments of the present invention provide distributed intelligent routing for calls initiated by an ATA 10, which is located at a subscriber site. The subscriber may be referred to as a customer or user. Equipment at the subscriber site is often referred to in the industry as CPE (customer premises equipment). The ATA may place (and receive) calls over a broadband packet network 15 such as the Internet through a network connection 20, or possibly over the PSTN 25 through an optional foreign exchange office (FXO) port 30 connected to a landline 35. As will be discussed below, the ATA may also be connected to a number of client devices 40 over a subscriber-site (local area) network 45 (e.g., HPNA, Ethernet, DECT, wireless).

The VoIP subscriber connects ATA 10 to the network connection 20 connected through a modem and possibly a router and firewall 50 to a broadband network connection 55. Optionally the ATA provides a subscriber-site network connection 60 to connect client devices 40. The ATA and client devices can each provide foreign exchange service (FXS) connection 65 for locally connected telephone devices 70. Telephone devices can be telephones, answering machines, cordless phones, fax machine, modems or other telephone equipment.

The ATA can optionally be connected to a landline interface through the foreign exchange office (FXO) port 30 to carry calls through the PSTN 25 to a PSTN subscriber 75. Alternatively, calls may be routed to PSTN subscribers through the Internet 15 using session initiation protocol (SIP) ultimately through an Internet telephony service provider (ITSP) termination gateway 80 who connects the call through a PSTN connection 25 to a destination PSTN subscriber 85. Alternatively another subscriber to the VoIP service (or another service which peers with the VoIP service) can route a call from another ATA 90 to the ATA 10 or via the VoIP provider's network infrastructure 95. As can be seen, the VoIP provider's network infrastructure includes a network information server (NIS) 100, a transcoder 105 with integrated NAT traversal protocol handler 110, and a database or collection of databases 115.

For calls outbound from the ATA 10, the subscriber goes off hook with telephone device 70 and enters the desired destination by entering the desired phone number, or using voice dialing or otherwise indicating the destination of the phone call. The ATA processes the subscriber's input to determine the destination of the call. The processing might be in the form of collecting the dual tone multi-frequency (DTMF) digits or processing a voice command or forwarding a voice command on to a network server for processing with eventual determination made as to the destination of the call. Once the destination is determined, a message in the form of a session initiation protocol (SIP) invitation is sent through network connection 20 and broadband connection 55 through the Internet 15 to the VoIP service provider's network infrastructure 95 and the network information server (NIS) 100.

In the present embodiment, an inbound call intended for the subscriber can arrive from the subscriber's PSTN line (if it exists), an Internet telephony service provider (ITSP) providing origination services or from another subscriber to the same VoIP service.

Client Devices and Subscriber-Site Network

The ATA communicates to one or more client devices through an HPNA network established on the subscriber's twisted pair telephone wiring. Any network technology adequate to carry streamed media such as voice can be used for this communication between the ATA and client device. Interconnecting the ATA and client using IP networking over AC wiring (such as HomePlug) or over a wireless network (such as 802.11b, g or n) is also possible.

In addition to providing a HPNA network connection to communicate with the ATA, the client performs several functions:

1. The client can connect to an FXS port to connect to a subscriber's phone.
2. The client may include lights, buttons, speaker and/or a microphone and/or other user interface elements useful in delivering that service.

One skilled in the art will recognize that the client device can take many forms. Some devices may interact with the user using lights and buttons. Other designs may incorporate LCD displays, touch screens or touch pads, voice recognition or other means of user information and control.

Inbound Calls

Although embodiments of the present invention are directed primarily to routing outbound calls from the ATA 10, it is useful to consider the way inbound calls are handled. Inbound calls directed to the VoIP subscriber with ATA 10 can come from the following four possible sources:

1. If the ATA 10 is connected to a landline 35, then inbound calls can arrive from an originating PSTN subscriber 75 to the destination ATA 10 via the PSTN 25 and landline 35.
2. If the ATA 10 is not connected to a landline or the landline is busy and the call is redirected through a call forward busy feature to a phone number provided by an ITSP or the call is directed to a phone number assigned by the VoIP service and not associated with the landline 35, then the call originating from a PSTN subscriber 85 is routed to the ITSP 80 providing origination services for the subscriber's assigned phone number.
3. If the caller is another subscriber to the same VoIP service as the destination (or another VoIP provider who peers with the VoIP service), then the call originates from ATA 90 and is routed through the Internet using SIP to the VoIP provider network infrastructure where it is routed to destination ATA 10.
4. If the call is placed from a softphone 120 (such as Skype or GoogleTalk) with whom the VoIP provider has peered connections, then the call is routed through the Internet to the VoIP provider network infrastructure where it is routed using SIP to the destination ATA 10.

For inbound calls originating from any source other than the PSTN connection directly connected to the ATA or peer-to-peer connections directly from another ATA using a compatible codec, the call is routed through the Internet 15 to the VoIP provider's network infrastructure where it passes through transcoder 105 with an integrated NAT traversal protocol 110 to the destination ATA 10. The NAT traversal protocol is used to tunnel through the router/firewall 50 which may otherwise inhibit the unsolicited, inbound connection.

Outbound Calls—the ATA Call to the NIS

Outbound calls are initiated when a subscriber goes off hook on a telephone connected to the FXS port of either an ATA or client, or on a telephone integrated with the ATA device and dials a phone number. A call might also be initiated through voice dialing or through a user selection of a destination for the call of something other than a telephone number such as a soft phone client such as Skype or GoogleTalk. The DTMF associated with the target phone number is collected at the ATA or client and processed to determine the destination phone number. The ATA then sends a message containing the destination phone number to NIS 100 using Session Initiation Protocol ("SIP"). The latest version of the SIP specification is RFC 3261 from the IETF SIP Working Group. Optionally the ATA 10 is able to send multiple SIP invitations to multiple NIS servers.

Embodiments of the present invention provide systems and methods for controlling call flow in a VoIP system while also allowing for a flexible means for taking advantage of the most advanced codecs available for encoding voice streams between subscribers of a VoIP service and any call destination. At the same time, systems and methods are provided to seamlessly send media packets through routers performing network address translation (NAT) and security firewalls.

In a preferred embodiment of the present invention, an ATA connects to a source of wide area network (WAN) information such as a cable modem or DSL modem, the subscriber's router for general purpose data networking, a local telephone through an FXS port and optionally the subscriber's PSTN phone line. In addition, the ATA may connect to a network in the home over the subscriber's existing phone line connection or other network media. A standard such as the Home Phone Network Alliance (HPNA) can be used to implement a high-speed network over the subscriber's phone line that does not interfere with the voice or DSL network traffic which might also exist on the phone wiring.

The ATA performs several functions:

1. Route network traffic between the WAN and subscriber LAN, HPNA, DECT, or WiFi network.
2. Assure that real-time media such as telephony is prioritized higher than best-effort traffic typically carried over the subscriber's LAN. This improves the quality of VoIP phone calls carried in the home when there is contention between a VoIP call and other Internet traffic coming into the home.
3. Implement digital signal processing (DSP) functions such as audio compression and decompression, echo cancellation and audio mixing which may be required to deliver the VoIP service.
4. Optionally, the ATA may have an FXO (foreign exchange office) port to allow it to route calls directly to the PSTN in addition to routing via VoIP on the WAN connection.
5. Optionally the ATA may have an FXS (foreign exchange service) port to allow a subscriber's telephone to be connected directly to the ATA. In this way the ATA can also serve as a client device such as a telephone, fax machine, speakerphone or other telephony device.
6. Optionally the ATA may include lights, buttons, LCD display, touch screen, speaker and/or a microphone and/or other user interface elements useful in delivering that service.

Outbound Calls—the NIS Response to the ATA

NIS 100 examines the SIP invitation and determines what resources are available to terminate the call. This determination is made by querying the network infrastructure's database or collection of databases 115 to determine the IP addresses of the ITSP, softphone subscriber, or ATA that would be capable of delivering the call. These addresses are then incorporated into a SIP 302 redirect message passed back to the ATA 10. The ATA examines the available IP addresses provided by the NIS and selects one or more of them to attempt to complete the call. The IP addresses provided by the NIS might be for another ATA 90, or ITSP termination gateway 80 or a softphone provider 120 or its own IP address in the case where it might route the call through a PSTN line 35 connected directly to the ATA 10 or transcoder 105 or voicemail server or service provider for special phone numbers such as 911. The ATA might route through these IP addresses sequentially or in parallel where the first or highest quality or lowest cost route that completes is ultimately selected to carry the call.

This SIP invite message is received by NIS 100 which responds with a SIP 302 message indicating a selection of possible routes that the ATA may choose to complete the call. The SIP 302 message includes information that will be helpful to the ATA in determining how to route the call, but the ATA also monitors other sources of information which may determine the ultimate path the call takes as described later. The information provided in the SIP 302 message will vary depending upon the nature of the call as communicated by the ATA. The NIS analyzes the phone number sent by the ATA in the SIP invite message and determines the appropriate information to send back to the ATA.

The tasks performed by NIS 100 may include one or more of:

Authenticate that the requesting ATA is authorized to place a call;
If the calling ATA has a PSTN line connected to it, determine if the destination of the call is local to that ATA;
Determine if the call being placed is directed to another subscriber and if so determine the associated IP address of the destination subscriber;
Determine if the call is directed to voicemail and determine the associated IP address of the voicemail server;
Determine if the call is directed to special numbers such as 411, 611, 911, POPCORN etc. and determine the associated IP address;
Determine what the possible routes are (the typical case for a long distance call); and
Determine if the number is valid.

The NIS' response is determined by its querying various databases to determine the authenticity of the requesting ATA, the characteristics of the call destination and the existence of network resources available to complete the call.

The possible SIP 302 response consists of multiple IP addresses from which the ATA chooses to optimize routing of the call. The ATA then directs the call based on the information provided by the SIP 302 response and based on conditions it detects. For example, if the originating ATA has a PSTN line connected, the SIP 302 message may indicate that a valid route for the call can be found at 127.0.0.1 (the ATA's own local IP address), but if the ATA detects that its own PSTN line is carrying another call, then it can select an alternate route without having to go back to the NIS for further information.

In an extreme case, an ATA that happens to have a PSTN connection may initiate a call to another phone number that happens to be that of another in-network subscriber. In response to the ATA's SIP invite message, the NIS might respond with several IP addresses from which the ATA can choose to route the call. The multiple IP addresses may include some or all of the following:

The IP address of the destination subscriber associated with that phone number;
The ATA's own local IP address if the destination subscriber happens to be within the free local calling area of the PSTN connection to the originating ATA;
The IP address of an available transcoder;
The IP address of a primary termination gateway capable of completing the call; and
The IP address of a backup termination gateway capable of completing the call.

Outbound Calls—the ATA Routing the Call in Response to the NIS Response

Figure 2:
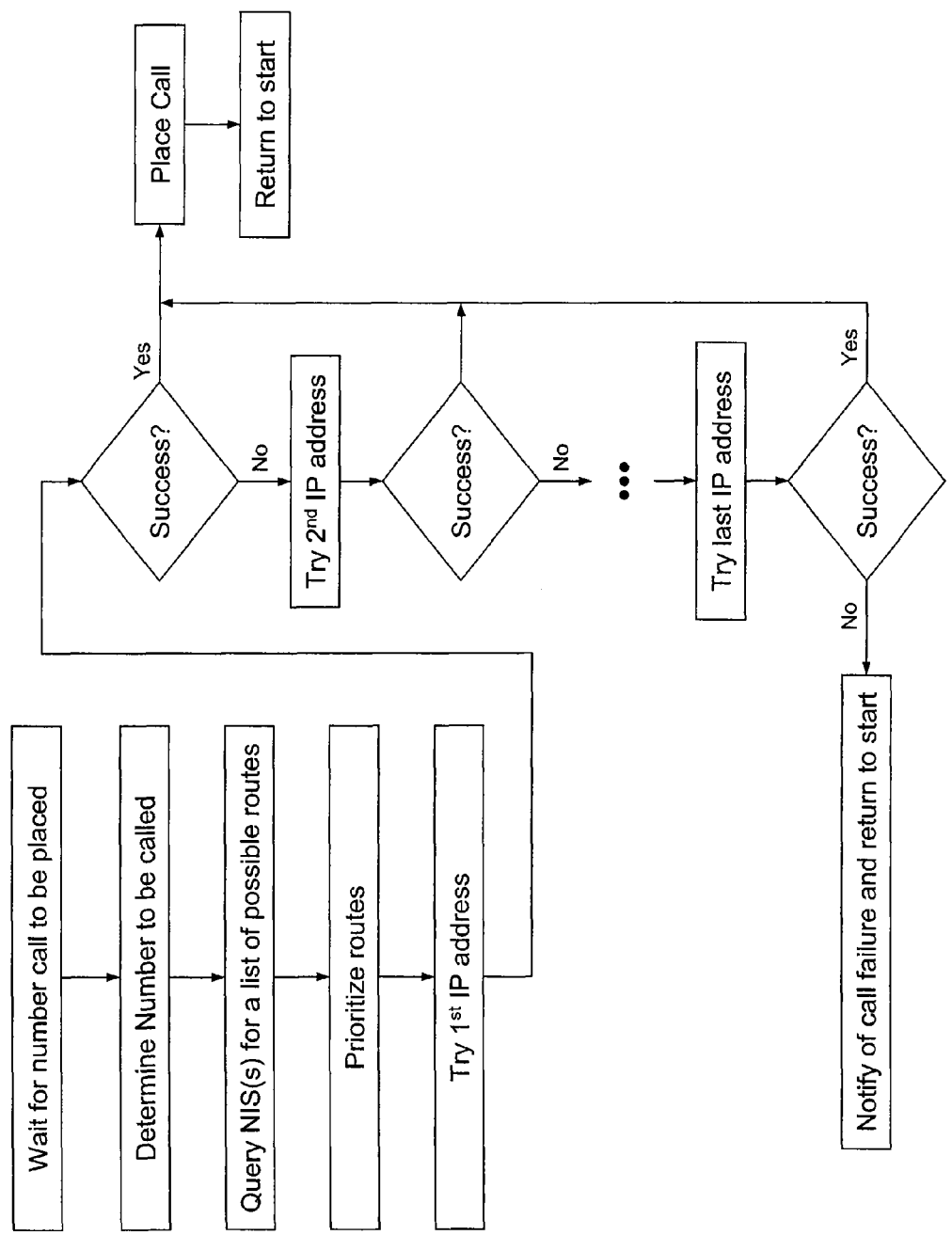
FIG. 2 is a is a flowchart showing a representative method by which the ATA performs call routing.

FIG. 2 is a is a flowchart showing a representative method by which the ATA can perform call routing. Upon receiving the NIS response, the ATA may attempt to route the call directly to the IP address of the destination subscriber. This route may be preferred because the quality of the audio directly between subscribers may be superior to that carried over the PSTN connection in addition to being free. However, the originating ATA may get no response from the destination in certain cases, such as when the broadband connection at the destination ATA is down. If that first attempt times out or is otherwise refused by the destination, then the originating ATA may check its own local PSTN line, since the NIS's message indicated that that would be a desirable route, perhaps because the destination is within the free local calling area of the originating ATA. But the ATA may determine that the subscriber's PSTN line connected to the ATA is occupied and unable to complete a call. The ATA might then attempt to terminate the call through the IP address of the primary termination gateway whose address was also provided in the NIS message. The ATA recognizes from the NIS response that the recommended termination gateway is not compatible with the codec 125 used by the ATA.

This requires that the ATA route the call through a transcoder before it is sent to the final termination. The ATA routes through the transcoder by issuing a SIP invitation to the transcoder along with the IP address of the primary termination gateway provided by NIS 100. The transcoder then transcodes the media stream from the originating ATA from the compression standard preferred by the ATA to one that is compatible with the termination gateway and sends an invitation to the indicated gateway. If the intended termination gateway is unable to terminate the call, then the transcoder will either receive a SIP refusal message or no response from the gateway, in which case the ATA may attempt to route the call to an alternate transcoder or gateway, or send a SIP refusal message back to the originating ATA. The ATA might then complete the call through the backup termination gateway (routed via a transcoder). As can be seen, each ATA in the network has the processing capability, information and network monitoring capability to select the eventual route in a distributed fashion, without having to repeatedly query a central resource and taking advantage of timely information provided directly by the elements in the network which ultimately route the call.

In another scenario, the ATA may not receive its own IP address (127.0.0.1) as a desirable route for the call, but if it fails to complete the call with the other possible routes, the ATA may use its own PSTN connection anyway as completing the call, even at the expense of a toll call charged to the subscriber, may be preferable to not completing the call at all.

In another embodiment of the present invention, the ATA may query multiple NIS's to allow it to expand its selection of possible routes.

In another embodiment of the present invention, multiple routes may be attempted simultaneously rather than sequentially as described above.

It is noteworthy that the SIP 302 response also includes information needed by the ATA to assure the format of the audio for the call is compatible with the eventual destination of the call. This is important because the choice of codec and packet loss concealment (PLC) technology strongly affect the quality of the call and require that the sender and receiver be compatible. For example, the ATA's preferred codec for the audio streams associated with a call is iLBC because its psycho-acoustic based compression requires less bandwidth and its built in PLC provides higher perceived audio quality when the stream is transmitted over packet networks which are not 100% reliable. Other commonly used codecs such as G.711 are fragile and quickly exhibit objectionable audio artifacts when even a small percentage of packets are lost in transmission. By contrast, iLBC can provide excellent quality audio even when 25% or more of the packets in the transmission are lost. Other codecs capable of providing much higher audio frequency response and even better overall quality are available, but not typically used by VoIP services because of incompatibility with termination gateways. In embodiments of the present invention, the ATA is able to optimize the routing of the call to the destination so as to maximize call quality and minimize cost.

In a representative embodiment of the present invention the transcoder is implemented as a server running a modified SIP protocol running on a standard rack-mount PC running Linux. The transcoder has the intelligence to interpret proprietary signaling from the ATA to direct the call appropriately and to handle the error case where the destination gateway is unable to complete the call. The transcoder typically handles many calls simultaneously and multiple codec translation types. For example, calls that are directed to voice mail may be most efficiently stored using a codec such as MP3 which is optimized for storage of voice on mass storage as opposed to transmission over a packet network susceptible to packet loss. Similarly, translation from a wideband codec into iLBC or G.711 may be required where a more advanced ATA capable of wideband audio is sending a call to a termination gateway which may lack a wideband capability.

In addition to providing distributed routing and codec flexibility, embodiments of the present invention provides ease of ATA installation and configuration for the subscriber by efficiently implementing a means and method to seamlessly integrate with a subscriber's router and firewall. Accomplishing this requires that the media stream representing the voice conversation be passed between the subscriber's ATA and the VoIP operator's network infrastructure without requiring that the subscriber replace or reconfigure any of his network equipment, particularly his network router and network firewall.

With the proliferation of IP devices has come a proliferation of routers performing network address translation (NAT) and firewalls. NATs make it possible for multiple devices to share a common means to access the Internet. A router assigns local addresses to all local devices "behind" the router that are served by the broadband connection. This may include the subscriber's PC, printer, IP-enabled refrigerator or his ATA. The router provides a dynamic translation of addresses between the local devices and devices on the public Internet. Public devices direct their packets to the router's public IP address and a port number which is then mapped back to the address of a local device. Typically NAT routers also include security firewalls which serve to block unwanted traffic. In particular, traffic initiated from outside the firewall is typically blocked since it could come from a malicious source.

For the ATA, this arrangement has many important implications. While the ATA is able to initiate communication to any device with a public IP address, firewalls typically block unsolicited sessions coming from a public device. This poses a problem for a subscriber's ATA which needs to receive calls which take the form of unsolicited sessions coming from the VoIP operator's network infrastructure in the public Internet. Further, SIP messaging includes address information from the local ATA which is useless to the VoIP operator's network infrastructure since the addresses seen by the ATA are translated and not routable from outside the NAT firewall.

Historically several approaches have been taken to overcoming these problems. The IETF STUN (Simple Traversal of UDP through Network Address Translators) protocol defines a server in the public address space to which the client sends an exploratory STUN message. The STUN server responds to the client with the public address and ports being used by the NAT. These can then be used to establish a call. With STUN, the media stream associated with any call does not pass through the STUN server. Once the address and port of the client is determined, they are used by the calling client or service.

However there is a difficulty with this approach. More advanced firewalls (referred to as symmetric NATs) will block traffic from unfamiliar public addresses even if they are directed to valid address/port mappings. In the case of STUN, the firewall is aware of the mapping to the STUN server's IP address, but STUN depends upon reusing that mapping for traffic coming from a different IP address for example, another VoIP subscriber's ATA attempting a peer-to-peer call. For an ATA receiving a call behind a symmetric NAT, the call from an ATA trying to reuse the address determined by the STUN server will fail since the originating ATA has a different address from that of the STUN server.

In embodiments of the present invention, this limitation of STUN is overcome by the fact that it is possible to extend the function of the transcoder to include NAT traversal. In embodiments of the present invention, a virtual private network (VPN) connection is established (initiated by each ATA) and maintained between the VoIP provider's network infrastructure and each ATA. When a call is directed to an ATA, a SIP invite message is sent to that ATA via the VPN connection with the address of a transcoder that will provide the media for the call. The destination ATA then initiates a connection to that transcoder establishing a connection through the ATA's local firewall. Relative to the STUN protocol, this has the disadvantage of requiring a media gateway between source and destination, but it has the advantage of making it possible to traverse symmetric NATs without having to resort to more complicated or less secure protocols such as UPnP or the IETF TURN protocol. In embodiments of the present invention, the transcoder acts as the media gateway for purposes of NAT traversal while simultaneously performing any media transcoding function which may be required for the call.

It is instructive to contrast this system and method of call routing from that of previous systems and methods in the art.

In U.S. Pat. No. 6,104,711 and its continuation U.S. Pat. No. 6,282,574, Voit describes a centralized name translation server which uses a name translation (such as a Domain Name Server) to control the routing of a call in a VoIP system. In performing the name translation, Voit monitors the destination gateway, the time of day and other parameters to determine which address to provide to the requester. The name translation server then responds to queries for name translation with a destination address conditioned on, among other factors, the status of the destination terminal. In Voit a single address is provided by the name translation server to the ATA to direct the route. A difficulty with this approach is that between the time the name translation server detects the status of the destination terminal and the time when the routing information is then received by the querying ATA, the status of the destination terminal may change causing the ATA to be unable to complete the call. The ATA is then left with an error condition and inadequate information to complete the call.

In Voit no allowance is made for the querying ATA to recover from such a situation other than to reinitiate the entire process. In embodiments of the present invention, no name translation is requested. Instead the ATA looks to the NIS to provide information (mainly in the form of multiple alternative IP addresses) that is helpful to determining the optimal route of the call. The ultimate decision for which route to take is made by the ATA based in information from the NIS, the transcode server, the ATA's own local connections and other factors known to the ATA. Where Voit uses the name translation server to assert centralized control over the routing of the call, in embodiments of the present invention, the NIS provides useful information for routing the call, but the ultimate routing decision for which route to take is delegated to each ATA in the system in a distributed fashion.

In U.S. Pat. No. 5,991,301 and its continuations U.S. Pat. No. 6,473,429, U.S. Pat. No. 6,665,429 and U.S. Pat. No. 6,298,064 (collectively Christie '301), Christie describes using a signal processing system for providing virtual connections through an ATM interworking multiplexer on a call by call basis. While the description of Christie '301 seems directed exclusively to carrying voice over ATM networks, to the extent it might have relevance to carrying voice over IP networks, it differs from embodiments of the present invention in several respects.

In Christie '301, a centralized signal processing system receives and processes signaling from a voice client, selects virtual connections through the network and then transmits signaling to identify the selections. The signaling to ATM interworking muxes (analogous to IP routers) establishes virtual network connections between subscribers under the direction and control of the signal processing system. In Christie '301, this centralized signal processing system performs function such as "translating, route selection, echo control, network management, signaling and billing." In embodiments of the present invention, these and other functions are generally performed in a distributed fashion with the ATA performing some (e.g. route selection, echo control and signaling), the transcode server performing some (translating) and separate call detail record processing performing others (such as billing).

In particular, Christie '301 calls for the signal processing system to perform functions not required of the NIS or any other element in the VoIP operator's network infrastructure, including:

Signaling from the signal processing server to the selected IP routers carrying the call. Where in an ATM network the connections through an interworking MUX may be statically selected from an external entity such as Christie's signal processing system, in the VoIP system of embodiments of the present invention, no such static route is used. Each packet may take a different path through the network to reach its final destination.

Signaling from the signal processing server to the termination gateway for the call. In embodiments of the present invention, no communication is made between the NIS and the termination gateway. Even the selection of which termination gateway to use (if any) is left to the ATA rather than any central system.

In U.S. Pat. No. 6,452,932 and its continuations U.S. Pat. No. 6,304,572, U.S. Pat. No. 6,463,052 and U.S. Pat. No. 6,633,561 (collectively Christie '572), Christie again describes an ATM communications system which some might read to encompass IP networks as in embodiments of the present invention. In Christie '572, a centralized communications control processor (CCP) orchestrates the switching path between points external to the network (specifically including the customer premises equipment). The CCP "always select[s] at least one network characteristic", meaning a network element or connection. In embodiments of the present invention, no such centralized control is asserted. Routing decisions are distributed to each ATA which routes the call as described, sometimes bypassing the VoIP operator's network infrastructure altogether.

In these patents, and in the art to date, it was the job of the centralized routing server to monitor and decide the route a call is to take. In embodiments of the present invention, routing decisions are generally distributed and only advisory messages are provided by central network elements.

What is claimed is:

1. A system for controlling the routing of VoIP calls that originate at subscriber sites, the system comprising:

a network information server (NIS) located at a provider site distinct from the subscriber sites, the NIS having a database of information helpful to optimally routing calls to their respective destinations;

an analog telephone adapter (ATA) located at a subscriber site, the ATA having a network connector to allow the ATA to receive calls from and place calls to a packet network, the ATA being configured to:

communicate, via the network connector, a call destination to the NIS;

receive, via the network connector, information from the NIS relevant to routing of the call, the information including a plurality of possible routes;

thereafter, determine the ultimate route of the call based on the plurality of possible routes derived from the information from the NIS and at least one other possible route not derived from information from the NIS; and initiate the call using the preferred routing.

2. The system of claim 1 wherein the at least one other possible route is determined based on a condition local to the ATA.

3. The system of claim 1 wherein the at least one other possible route is determined based on information received from a network resource other than the NIS.

4. The system of claim 1 wherein the ATA includes a connection to a PSTN line, which when invoked by the ATA, can be used to complete a call.

5. The system of claim 1 wherein the ATA has a local network connection, thereby allowing additional devices on the network to initiate and terminate calls that are routed through the ATA, thereby allowing multiple simultaneous calls to be routed.

6. The system of claim 1 wherein the NIS includes a mechanism to determine what phone numbers are local to the phone number of the ATA.

7. The system of claim 1 wherein the NIS includes a mechanism to authenticate the originating ATA.

8. The system of claim 1 wherein the NIS includes a mechanism to determine what termination gateways or services are available to terminate a call.

9. The system of claim 1 wherein the NIS includes a mechanism to determine the IP address of a route that can properly handle calls to special phone numbers.

10. A method, performed by an analog telephone adapter (ATA) located at a subscriber site, for controlling the routing of VoIP calls, the method comprising:

the ATA determining the destination of a call on the basis of input signals;

the ATA requesting routing information for the destination from a network information server (NIS) located at a provider site distinct from the subscriber site, the NIS having a database of information helpful to optimally routing calls to their respective destinations;

the ATA ascertaining one or more non-NIS conditions relevant to routing of the call;

the ATA receiving multiple candidate IP addresses from the NIS;

the ATA thereafter determining a preferred routing of the call based on the IP addresses received from the NIS and the one or more non-NIS conditions; and the ATA initiating the call using the preferred routing.

11. The method of claim 10 wherein the input signals originate from user input to a connected telephony device.

12. The method of claim 10 wherein the one or more non-NIS conditions include a condition local to the ATA.

13. The method of claim 12 wherein the condition local to the ATA is the presence of a PSTN connection.

14. The method of claim 12 wherein the condition local to the ATA is the capability to use a transmission medium other than the VoIP network.

15. The method of claim 10 wherein the one or more non-NIS conditions include information received from a network resource other than the NIS.

16. The method of claim 15 wherein the information received from a network resource other than the NIS includes an indication that a receiving ATA requires a particular audio format to receive a call.

17. The method of claim 15 wherein the information received from a network resource other than the NIS includes an indication that a receiving ATA is currently unavailable to receive a call over IP.

18. The method of claim 10 wherein the one or more non-NIS conditions include:

a condition local to the ATA; and information received from a network resource other than the NIS.

* * * * *